US010661613B1

(12) United States Patent
Williams

(10) Patent No.: US 10,661,613 B1
(45) Date of Patent: May 26, 2020

(54) ELECTRONIC TIRE PRESSURE REGULATING SYSTEM

(71) Applicant: Cody Williams, Corona, CA (US)

(72) Inventor: Cody Williams, Corona, CA (US)

(*) Notice: Subject to any disclaimer, the term of this patent is extended or adjusted under 35 U.S.C. 154(b) by 154 days.

(21) Appl. No.: 15/858,098

(22) Filed: Dec. 29, 2017

Related U.S. Application Data

(60) Provisional application No. 62/440,608, filed on Dec. 30, 2016.

(51) Int. Cl.
B60C 23/00 (2006.01)
F16K 17/02 (2006.01)
(Continued)

(52) U.S. Cl.
CPC ........ B60C 23/004 (2013.01); B60C 23/0467 (2013.01); F16K 17/02 (2013.01); F16K 31/02 (2013.01)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00; G01M 99/002; B60C 23/0494; B60C 2019/004; B60C 19/00; B60C 23/04; B60C 23/0493; B60C 23/0498; B60C 23/0496; B60C 23/064; B60C 23/0408; B60C 23/041; B60C 23/0411; B60C 23/0488; B60C 23/20; B60C 11/243; B60C 11/246; B60C 23/06; B60C 23/00; B60C 23/0486; B60C 23/061; B60C 11/0083; B60C 13/003; B60C 2009/2038; B60C 23/003; B60C 23/004; B60C 23/02; B60C 23/0401; B60C 23/0416; B60C 23/0433; B60C 23/0455; B60C 23/0489; B60C 23/0491; B60C 25/002; B60C 25/005; B60C 25/007; B60C 29/02; B60C 3/04; B60C 99/00; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/001; B60C 23/007; B60C 23/008; B60C 23/0406; B60C 23/0413; B60C 23/0427; B60C 23/0447;
(Continued)

(56) References Cited

U.S. PATENT DOCUMENTS 3,361,180 A 1/1968 Neilson
3,537,663 A 11/1970 Johnson
(Continued)

Primary Examiner — Andre J Allen
(74) Attorney, Agent, or Firm — Knobbe Martens Olson & Bear LLP

(57) ABSTRACT

A tire pressure regulating system and method are provided. The system includes a manifold that provides a fluid flow path between a pressure switch and a valve. The valve can switch between an open state and a closed state. Air bleeds from the tire when the valve is in the open state. The pressure switch signals the valve to open and close according to the pressure inside the manifold that is supplied from air pressure inside the tire.

7 Claims, 5 Drawing Sheets

(51) Int. Cl.
 *F16K 31/02* (2006.01)
 *B60C 23/04* (2006.01)
(58) Field of Classification Search
 CPC ............ B60C 23/0454; B60C 23/0459; B60C 23/0462; B60C 23/0467; B60C 23/0471; B60C 23/0472; B60C 23/0474; B60C 23/0476; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28
 USPC ................................................. 73/146–146.8
 See application file for complete search history.

(56) References Cited

U.S. PATENT DOCUMENTS

| | | | |
|---|---|---|---|
| 3,961,309 A | 6/1976 | Eddy | |
| 4,742,854 A | 5/1988 | Forslund | |
| 4,763,709 A | 8/1988 | Scholer | |
| 5,257,642 A | 11/1993 | Worth | |
| 5,540,268 A * | 7/1996 | Mittal | B60C 23/003 152/415 |
| 5,587,698 A | 12/1996 | Genna | |
| 5,647,927 A * | 7/1997 | Mason | B60C 23/003 152/415 |
| 5,832,951 A | 11/1998 | Conroy, Sr. | |
| 5,928,444 A | 7/1999 | Loewe | |
| 5,954,084 A | 9/1999 | Conroy, Sr. | |
| 6,161,565 A | 12/2000 | Conroy, Sr. | |
| 6,894,607 B1 | 5/2005 | Claussen | |
| 7,690,411 B2 | 4/2010 | Wilson | |
| 9,566,833 B2 | 2/2017 | Swindell | |
| 2002/0121323 A1 * | 9/2002 | Tarasinski | B60C 23/003 152/416 |
| 2008/0202590 A1 * | 8/2008 | Farrow | F02M 21/06 137/8 |
| 2012/0282568 A1 * | 11/2012 | Disel | A61C 17/02 433/80 |
| 2014/0012466 A1 | 1/2014 | Tanno | |
| 2014/0090463 A1 | 4/2014 | Nagora | |
| 2018/0031142 A1 * | 2/2018 | Hillo | F16K 31/042 |
| 2019/0070907 A1 * | 3/2019 | Dudar | B60C 23/003 |

\* cited by examiner

ELECTRONIC TIRE PRESSURE REGULATING SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference herein and made a part of the present disclosure.

BACKGROUND

Field

The present disclosure relates to generally systems and methods for regulating tire pressure and, in particular methods and systems for venting air from a tire.

Description of the Related Art

Tire pressure affects the ability of a tire tread to grip the road. In racing, tire pressure must be tightly controlled in order to achieve best performance. A lower tire pressure can provide better traction by increasing tread contact with the road. A higher tire pressure can reduce traction and may produce higher speed given the reduced frictional forces.

Tire pressure can change as tire temperature changes. As a tire heats up, the tire pressure can increase. Tires can heat up during a race, changing the tire pressure and affecting tire performance. Race drivers may try to anticipate tire pressure changes that will occur as the tire heats up by initially underinflating their tires. A problem with underinflating the tires is that tire performance may be compromised until the tire heats up enough to reach the desired pressure. Conventional bleeder valves can use a spring-like regulator to let out air as the tire heats up. A problem with bleeder valves is that they are subject to sticking. A stuck bleeder valve can result in a flat tire that may cause a driver to lose a race. What is needed is an improved way of regulating tire pressure.

SUMMARY

The systems, methods and devices described herein have innovative aspects, no single one of which is indispensable or solely responsible for their desirable attributes. Without limiting the scope of the claims, some of the advantageous features will now be summarized.

In some embodiments, a pressure-regulating system is provided. The pressure-regulating system can be adapted to regulate the pressure of a tire. The pressure-regulating system comprises a pressure switch, a valve, and a manifold. The manifold comprises an inlet chamber and an outlet chamber. The inlet chamber is fluidically connected to the pressure switch and an inlet of the valve. The valve has an open state and a closed state, wherein a fluid flow path is established between the outlet chamber and the inlet chamber when the valve is in the open state. The fluid flow path between the outlet chamber and the inlet chamber is blocked when the valve is in the closed state.

In some implementations, the valve is a solenoid valve. In some arrangements, an electrical signal from the pressure switch opens the valve. In some configurations, the pressure-regulating system further comprises a logic circuit configured to receive an input signal from a pressure sensor adapted to detect a pressure inside the inlet chamber. In some configurations, the logic circuit is adapted to send an output signal to the valve to switch the valve between the open state and the closed state. In some arrangements, the pressure switch is mounted on a centerline of an axel when the system is mounted in a hollow space of the axel.

In some arrangements, the system further comprises a removable battery electrically coupled to the pressure switch. In some configurations, the system further comprises a mounting collar attached to the manifold, the mounting collar being configured to secure the system within a hollow axel.

In some embodiments, a method of regulating a pressure of a tire is provided. The method includes transmitting a pressure from an internal space of the tire to a manifold; sensing with a pressure sensor a current pressure in the manifold; opening a bleed valve after the current pressure exceeds a set point pressure for an opening delay time; and closing the bleed valve after the set point pressure exceeds the current pressure for a closing delay time. The bleed valve is arranged to be in fluid communication with the manifold.

In some configurations, the method includes assigning the set point pressure based on an input from a user interface. In some configurations, the method includes assigning the opening delay time based on an input from a user interface. In some configurations, the method includes assigning the closing delay time based on an input from a user interface.

In some configurations, the manifold includes an inlet chamber and an outlet chamber, and opening the bleed valve provides a flow path from the inlet chamber to the outlet chamber. In some configurations, closing the bleed valve blocks the flow from the inlet chamber to the outlet chamber

BRIEF DESCRIPTION OF THE DRAWINGS

Throughout the drawings, reference numbers can be reused to indicate general correspondence between reference elements. The drawings are provided to illustrate example embodiments described herein and are not intended to limit the scope of the disclosure.

DETAILED DESCRIPTION

Figure 1:
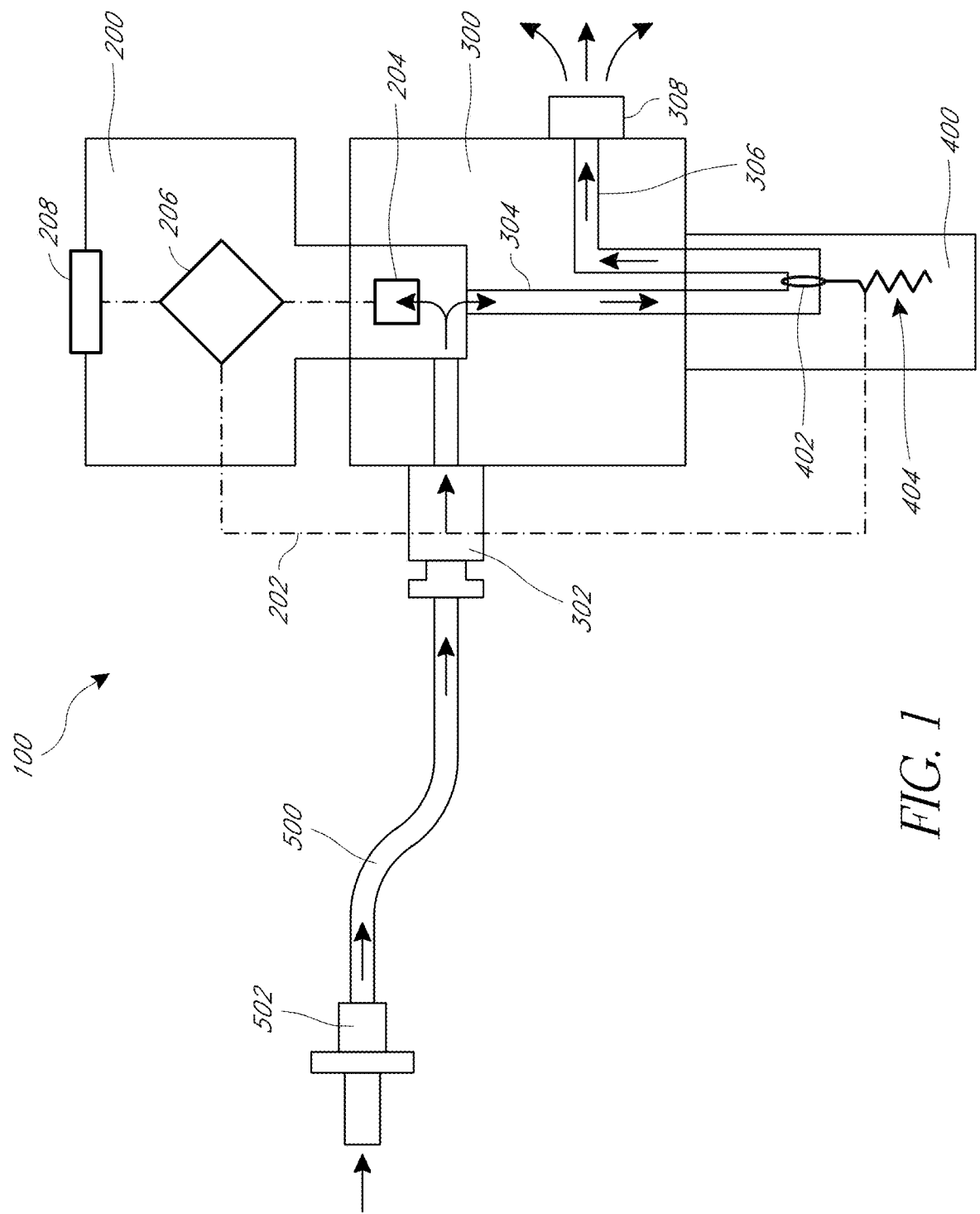
FIG. 1 is a schematic diagram of an embodiment of a pressure regulating system according to the present disclosure.

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Paved and dirt tracks can have bumps or grooves that can temporarily increase tire pressure when the tire hits the bump or groove. For example, dirt tracks develop "cushions," which are points in a corner where unused dirt meets the racing line. Conventional bleeder valves that have a mechanical diaphragm will vent air each time the tire pressure temporarily increases due to the tire striking the cushion. This may lead to an undesirable over-deflation of the tire. In certain aspects, the methods and systems of the present disclosure can regulate tire pressure while avoiding over-deflating the tire.

FIG. 1 shows a schematic diagram of a tire pressure regulating system 100 of the present disclosure. The system 100 can include a pressure switch 200, a manifold 300, a bleed valve such as a solenoid valve 400, and a connecting line 500. The connecting line 500 can provide a fluid flow pathway that connects the inner space of a tire (shown in FIG. 2) to the manifold 300. The connecting line 500 can attach to a tire port 502 that provides a fluid flow path between the connecting line 500 and the space within the tire. The manifold 300 can receive air from the connecting line 500 through an inlet port 302. The manifold 300 can have an inlet chamber 304 that fluidically connects the inlet port 302, the pressure switch 200, and the solenoid valve 400, as shown in FIG. 1. The inlet chamber 304 can provide flow pathways that allow the air that enters the manifold 300 to reach the pressure switch 200 and the solenoid valve 400, as depicted by the arrows in FIG. 1. The manifold 300 can have an outlet chamber 306 that connects the solenoid valve 400 with an outlet port 308. The outlet port 308 can be adapted to allow air within the manifold 300 to vent to the outside environment. In some arrangements, only a single connecting line 500 connects the manifold 300 to the inner space of the tire.

The solenoid valve 400 can have a blocking element 402. The blocking element 402 can have an open state and a closed state. In the open state, the blocking element 402 can allow fluid communication between the inlet chamber 304 and the outlet chamber 306. In the closed state, the blocking element 402 can block fluid communication between the inlet chamber 304 and the outlet chamber 306. In this way, the blocking element 402 can regulate whether air inside the manifold 300 can vent to the outside environment through the outlet port 308.

The solenoid valve 400 can include an actuator 404 that can switch the blocking element 402 between the open and closed states. The actuator 404 can be connected to the pressure switch 200 by an electrical wire 202 (shown as a dashed line in FIG. 1). The electrical wire 202 can provide a pathway for the pressure switch 200 to signal the solenoid valve 400 to open or close the blocking element 402. In this way, the pressure switch 200 can control whether air from the tire can vent to the outside environment.

The pressure switch 200 can include a pressure sensor 204. The pressure sensor 204 can be adapted to sense the pressure within the inlet chamber 304 of the manifold 300. As described in more detail below, the pressure switch 200 can be configured to open the solenoid valve 400 when the pressure sensor 204 detects that the pressure within the inlet chamber 304 is above a threshold pressure. In this way, the system 100 can allow air within a tire to vent to the outside environment when the pressure within the tire is above a threshold pressure. The system 100 can allow a user to set the threshold pressure at which the pressure switch 200 signals the solenoid valve 400 to open.

The system 100 can include a logic circuit 206 (e.g., processor). The logic circuit 206 can receive an input signal from the pressure sensor 204. The logic circuit 206 can send an output signal to the solenoid valve 400. The logic circuit 206 can control the operation of the solenoid valve 400 based on input from the pressure sensor 204. The system 100 can include an interface 208 that allows a user to program the operation of the system 100. For example, the interface 206 can allow a user to program the logic circuit 206. The system 100 can allow a user to set the threshold pressure at which the pressure switch 200 signals the solenoid valve 400 to open. The system 100 can provide an opening time delay, which herein refers to a time delay between the time the pressure sensor 204 detects a pressure that exceeds the threshold pressure and the time a signal is sent to open the solenoid valve 400. The system 100 can provide a closing time delay, which herein refers to a time the pressure sensor 204 detects a pressure that no longer exceeds the threshold pressure and the time a signal is sent to close the solenoid valve 400. The system 100 can allow a user to program the opening time delay, the closing time delay, or both.

In certain aspects, the system 100 can provide better control of tire pressure without over-venting the tire in response to temporary spikes in tire pressure that may arise from the tire striking a groove or bump in the track. For example, in the system 100, the air pressure from the tire goes to the manifold 300 and supplies pressure to the pressure switch 200 and to the solenoid valve 400. The pressure switch 200 can be programmed to have a time delay (e.g., opening time delay) so that when the pressure from the tire exceeds the set point for the opening time delay amount of time, the pressure switch 200 will signal the solenoid valve 400 to open. When the solenoid valve 400 opens, the pressure in the inlet chamber 304 of the manifold 300 will fall. This fall in pressure will be detected by the pressure sensor 204 of the pressure switch 200, indicating to the pressure switch 200 that the pressure has gone below the set point. This will start the closing time delay that was set in the system 100. Once the closing time delay has elapsed, the pressure switch 200 can send a signal to the solenoid valve 400 to close the solenoid valve 400. As long as the pressure switch 200 detects the pressure in the inlet chamber 304 is above the set point, the system 100 will continue this process of opening the solenoid valve 400, allowing the closing time delay to elapse, and then closing the solenoid valve 400. The system 100 will stop repeating this process once the solenoid valve 400 is closed and the pressure switch 200 detects the tire pressure is at or below the set point. In some implementations, the manifold 300 can allow the pressure switch 200 to be more sensitive to detecting when the tire is being bled. An advantage of connecting the pressure switch 200 to the interior tire space through the manifold 300 rather than connecting the pressure switch 200 directly to the tire space is that the pressure switch 200 can sense tire bleeding as a larger pressure drop within the small volume of the manifold 300 rather than a smaller pressure drop within the large volume of the interior tire space. In some embodiments, the system 100 uses a single connector line 500 to connect the interior tire space to the manifold 300. The use of a single connector line 500 can slow bleeding of the tire and can prevent and/or reduce over-bleeding the tire.

Figure 2:
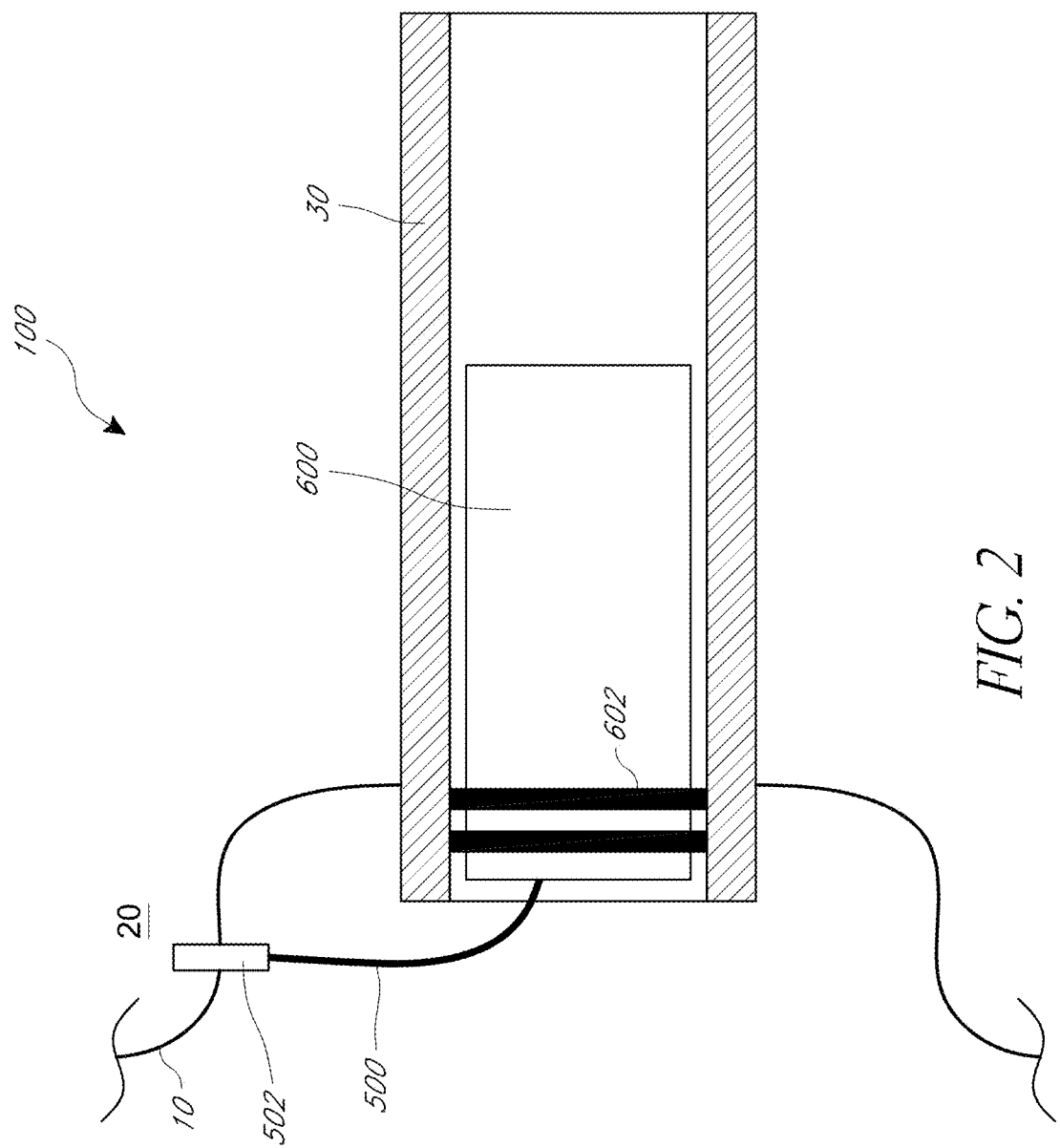
FIG. 2 is a schematic diagram showing a pressure regulating system mounted onto the axel of a vehicle.

FIG. 2 shows the system 100 mounted in the axel 30 of a vehicle. The system 100 can include a housing 600 that is sized to fit within the central space of a hollow axel 30. The housing 600 can have one or more O-rings 602 that surround the housing 600. The O-rings 602 can help maintain the housing 600 seated within the central space of the hollow axel 30. The O-rings 602 can be sized to establish frictional forces that resist the housing 600 from moving along the longitudinal axis of the hollow axel 30. The tire port 502 can be attached to a wheel 10 on which the tire (not shown) is mounted. One end of the tire port 502 can access the space 20 within the tire. The other end of the tire port 502 can be attached to the connecting line 500. As shown in FIG. 2, because the wheel 10 is attached to the axel 30, the connecting line 500 and the housing 600 will rotate in unison with the tire port and the wheel 10. In some implementations, one or more components of the system 100 can be mounted on or near the centerline of the axel 30 to reduce centrifugal forces on the component. For example, in some implementations the solenoid valve 400, the pressure switch 200, or both can be mounted on the centerline of the axel 30.

Figure 3:
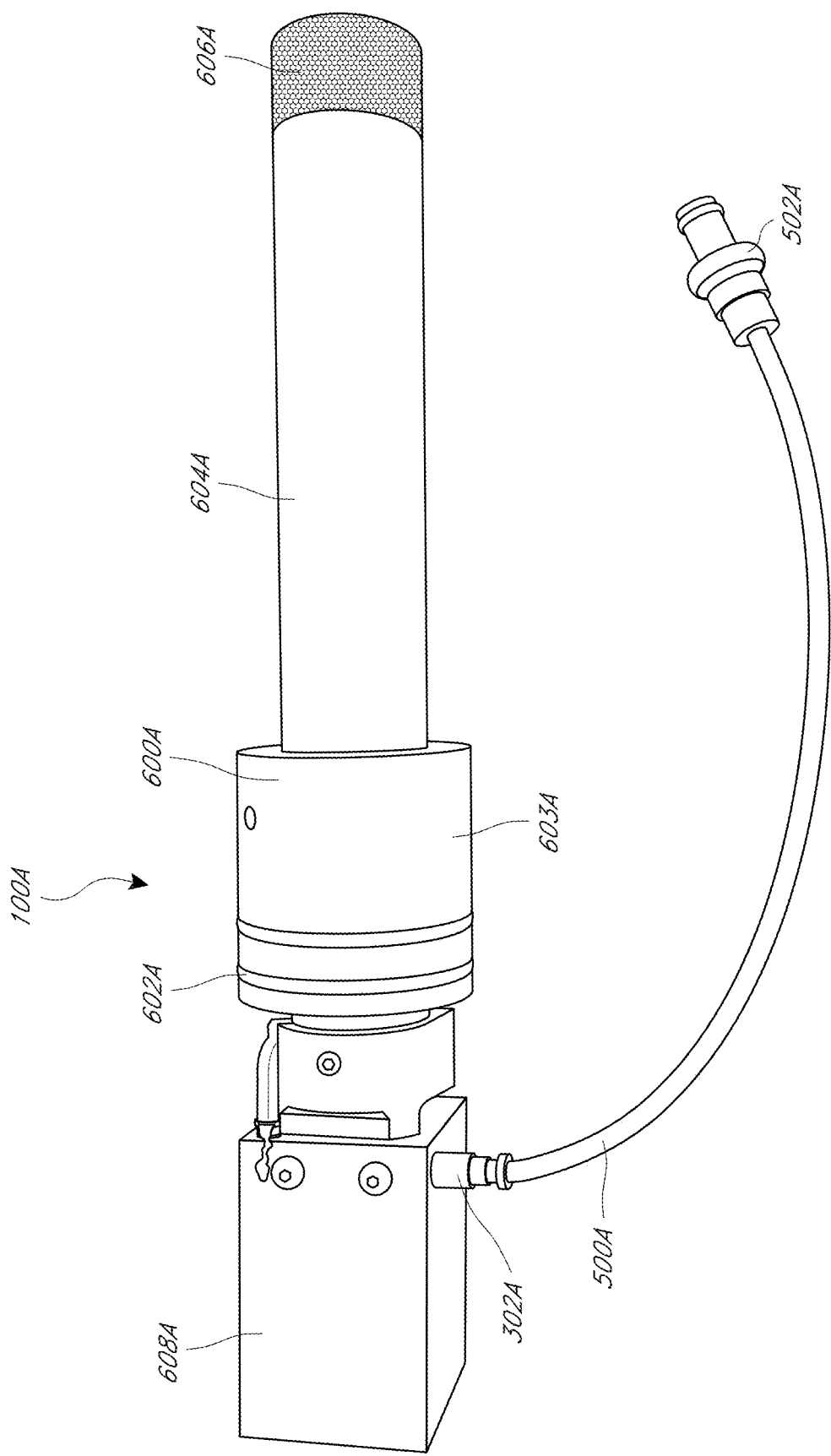
FIG. 3 is a top view of an embodiment of a pressure regulating system.

FIG. 3 shows a top view of a non-limiting illustrative embodiment of a tire pressure regulating system 100A of the present disclosure. The housing 600A can include an extension 604A that can be sized to hold a power source (e.g., battery). In some implementations, the power source is removable (e.g., removable battery pack). The extension 604A can have an endcap 606A that can be removably attached to the extension 604A. The extension 604A can be arranged so that the interior space of the extension 604A can be accessed by removing the endcap 606A from the extension 604A. The housing 600A can include a control module 608A.

As shown in FIG. 3, the system 100A can include a mounting collar 603A. The mounting collar 603A can allow the system 100A to be appropriately sized for the hollow axel 30 (shown in FIG. 2) into which the system 100A is installed. In some implementations, the mounting collar 603A can be removably mounted onto the extension 604A. One or more mounting O-rings (not shown) can be interposed between the mounting collar 603A and the extension 604A when the mounting collar 603A is mounted onto the extension 604A. The mounting collar 603A can be removed from the extension 604A, such as by sliding the mounting collar 603A off of the extension 604A over the endcap 606A. The mounting collar 603A can be replaced with a second mounting collar 603A that has an outer diameter that is smaller than the outer diameter of the removed mounting collar 603A, thereby configuring the system 100A to be installed in a hollow axel 30 having a small internal diameter. In some implementations, the system 100A can be mounted into the axel 30 without a mounting collar 603A mounted on the extension 604A. When the system 100A is mounted into an axel without the system 100 having a mounting collar 603A on the extension 604A, one or more mounting O-rings (not shown) that are mounted on the extension 604A can keep the system from moving along the longitudinal axis of the hollow axel 30.

Figure 4:
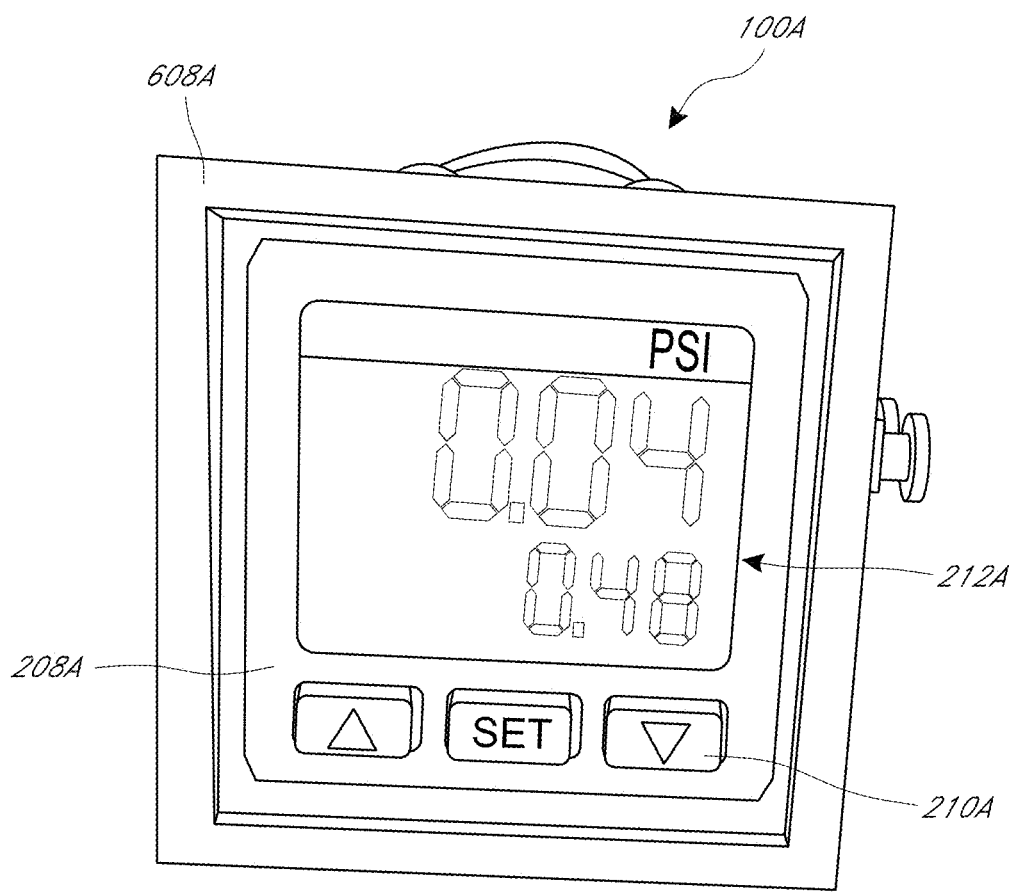
FIG. 4 is a front view of the embodiment of the pressure regulating system of FIG. 3.

FIG. 4 shows an end view of the system 100A shown in FIG. 3. The control module 608A can house the user interface 208A that can be used to program the system 100A. The user interface 208A can include one or more buttons 210A that allow a user to input operational parameters for the system 100A. For example, the user interface 208A can allow a user to specify set the pressure that triggers the system to vent air from the tire. The user interface 208A can allow a user to specify an opening delay time, a closing delay time, a threshold pressure, or combinations thereof. The user interface 208A can include a display 212A that allows a user to monitor the operational parameters of the system or the current pressure of the tire. In certain arrangements, the display 212A can be adapted to dim after the operational parameters have been set so that others cannot see the operational parameters that have been selected by the user.

Figure 5:
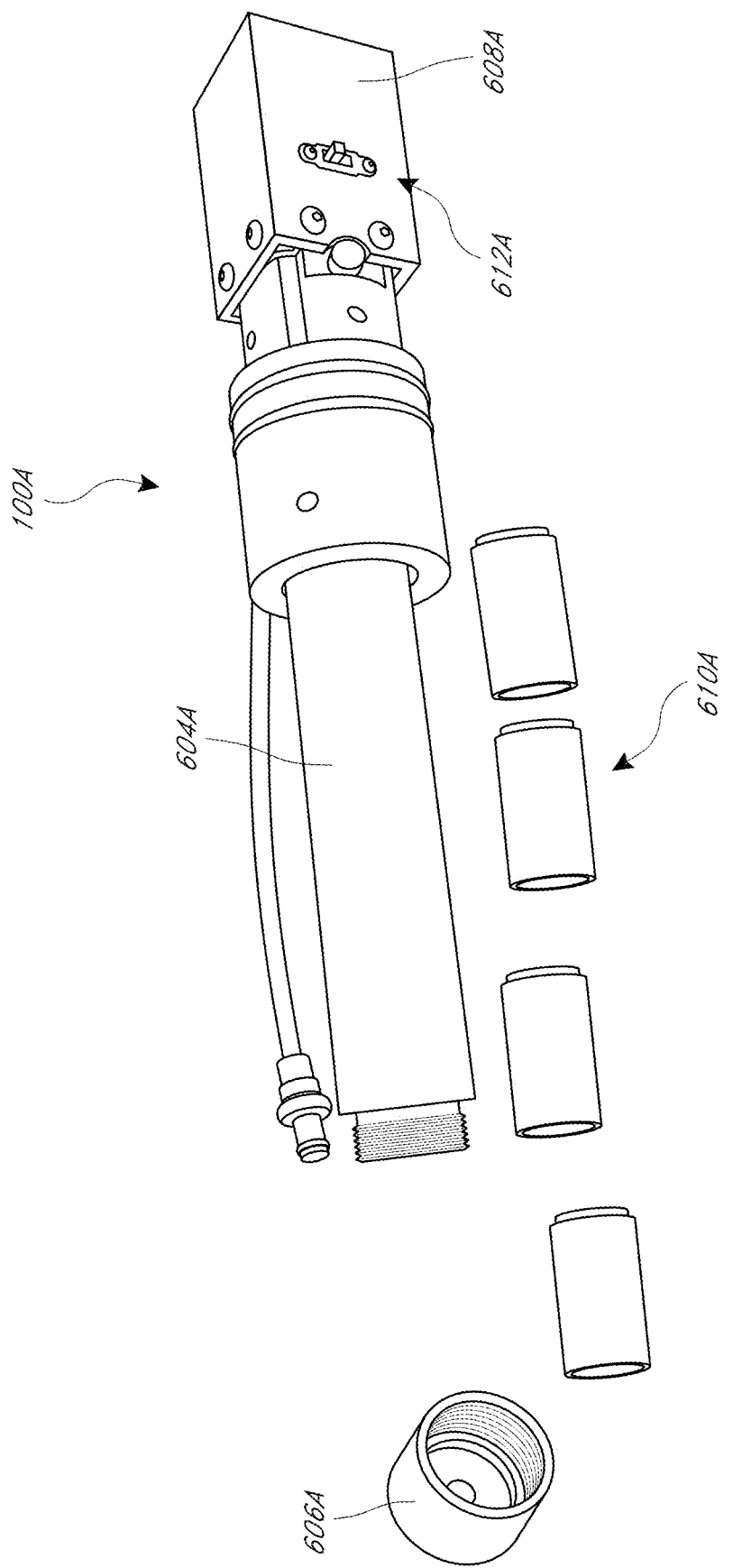
FIG. 5 is a partial side view of the embodiment of the pressure regulating system of FIG. 3.

FIG. 5 shows the system 100A of FIG. 3 with the end cap 606A removed from the extension 604A. In the illustrated embodiment, the extension 604A is sized to house four batteries 610A within the central portion of the extension 604A. The system 100A can be powered by more or less than four batteries 610A. In certain embodiments, the extension 604A is sized to hold a number of batteries 610A that is different from four (e.g., one, two, three, or more than four). The batteries 610A can be inserted into the extension 604A and the endcap 606A can be tightened onto the extension 604A to complete an electrical circuit, thereby allowing the batteries 610A to supply power to the control module 608A. In some implementations, the batteries 610A can be arranged as a removable battery pack. The control module 608A can have a power switch 612A that controls whether the batteries 610A supply power to the control module 608A.

The system 100 can be assembled onto a vehicle by inserting the housing 600 into the center of an axel 30 and inserting the tire port 502 into the wheel. The control module 608 can be turned on by the power switch 612. The user interface 208 can be used to set the desired tire pressure. The tire can then be filled until the system 100 starts to vent air, indicating the desired tire pressure has been reached. The wheel cover can then be put on.

In some arrangements, the system 100 can be set up to feel like conventional bleeders without losing pressure every time the tire hits a bump while getting the reliability of not sticking like conventional bleeder valves. The pressure can be set by 0.5 to 1.0 psi over the desired pressure. This may reduce the need to keep the tires hot on yellows or after reds in a race.

CONCLUSION

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. A method of regulating a pressure of a tire, the method comprising:
    transmitting a pressure from an internal space of the tire to a manifold;
    sensing with a pressure sensor a current pressure in the manifold;
    opening a bleed valve after the current pressure exceeds a set point pressure for an opening delay time, wherein the bleed valve is in fluid communication with the manifold; and
    closing the bleed valve after the set point pressure exceeds the current pressure for a closing delay time.

2. The method of claim 1 further comprising:
    assigning the set point pressure based on an input from a user interface.

3. The method of claim 1 further comprising:
    assigning the opening delay time based on an input from a user interface.

4. The method of claim 1 further comprising:
    assigning the closing delay time based on an input from a user interface.

5. The method of claim 1, wherein the bleed valve is a solenoid valve.

6. The method of claim 1, wherein the manifold comprises an inlet chamber and an outlet chamber, wherein opening the bleed valve provides a flow path from the inlet chamber to the outlet chamber.

7. The method of claim 6, wherein closing the bleed valve blocks the flow path from the inlet chamber to the outlet chamber.

* * * * *